United States Patent
Iwamoto et al.

(10) Patent No.: US 10,220,467 B2
(45) Date of Patent: Mar. 5, 2019

(54) ELECTRODE STRUCTURE FOR RESISTANCE WELDING

(71) Applicant: Dengensha Toa Co., Ltd., Kawasaki-shi, Kanagawa (JP)

(72) Inventors: Yoshiaki Iwamoto, Kanagawa (JP); Go Tamura, Kanagawa (JP); Shuhei Saeki, Kanagawa (JP)

(73) Assignee: Dengensha Toa Co., Ltd., Kawasaki-shi (JP)

( * ) Notice: Subject to any disclaimer, the term of this patent is extended or adjusted under 35 U.S.C. 154(b) by 500 days.

(21) Appl. No.: 14/939,607

(22) Filed: Nov. 12, 2015

(65) Prior Publication Data

US 2016/0375520 A1    Dec. 29, 2016

(30) Foreign Application Priority Data

Jun. 26, 2015 (JP) ................. 2015-129269

(51) Int. Cl.
*B23K 11/30* (2006.01)
*B23K 11/31* (2006.01)
*B23K 11/14* (2006.01)

(52) U.S. Cl.
CPC .......... *B23K 11/3009* (2013.01); *B23K 11/14* (2013.01); *B23K 11/30* (2013.01); *B23K 11/31* (2013.01)

(58) Field of Classification Search
CPC ..... B23K 11/14; B23K 11/30; B23K 11/3009; B23K 11/31; B23K 11/0053; B23K 11/36
USPC .................... 219/119, 93; 221/212
See application file for complete search history.

(56) References Cited

U.S. PATENT DOCUMENTS 5,105,060 A * 4/1992 Tanaka ............... B23K 11/36
219/78.01
6,254,332 B1 * 7/2001 Miura ............... B23K 11/0053
198/459.7

FOREIGN PATENT DOCUMENTS

| JP | 51-79074 A | 7/1976 |
|---|---|---|
| JP | 1-220632 A | 9/1989 |
| JP | 2-20671 A | 1/1990 |
| JP | 2-182383 A | 7/1990 |
| JP | 10-43870 A | 2/1998 |
| JP | 2008-161926 A | 7/2008 |

(Continued)

OTHER PUBLICATIONS

Japanese Office Action issued in corresponding Japanese Application No. 2015-129269 dated Oct. 27, 2015 (three pages).

(Continued)

*Primary Examiner* — Tu B Hoang
*Assistant Examiner* — Diallo I Duniver
(74) *Attorney, Agent, or Firm* — Crowell & Moring LLP

(57) ABSTRACT

An electrode structure is provided in which an upper pin having a magnet is built in a cavity inside an upper electrode so as to be vertically movable to allow its front end portion to protrude downward, and a lower pin is arranged so as to face the upper pin and built in a cavity inside a lower electrode so as to be vertically movable to allow its front end portion to protrude upward. In a state where the front end portion of the upper pin protrudes downward, the weld nut inserted onto it is attracted and held by the magnet. In a state where the upper pin is pushed upward by the lower pin, the weld nut comes off the upper pin and drops due to a less attracting force by the magnet, and then fitted onto the lower pin at a position higher than a workpiece.

3 Claims, 12 Drawing Sheets

(56) References Cited

FOREIGN PATENT DOCUMENTS

JP          2009-172655 A      8/2009
JP            2010-538 A       1/2010

OTHER PUBLICATIONS

Extended European Search Report issued in counterpart European Application No. 15193338.9 dated Jul. 1, 2016 (7 pages).

* cited by examiner

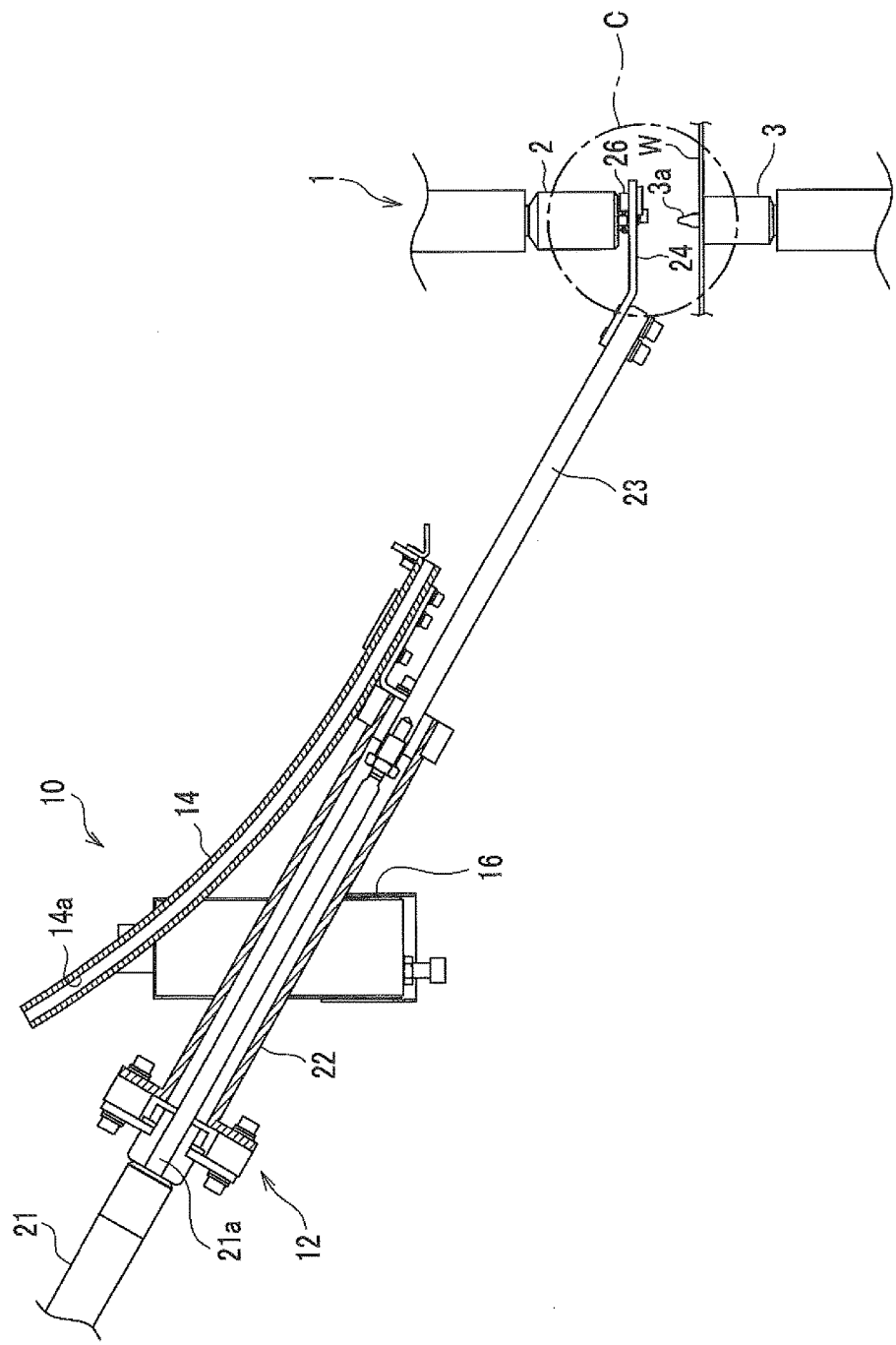

ELECTRODE STRUCTURE FOR RESISTANCE WELDING

TECHNICAL FIELD

The present invention relates to an electrode structure for resistance welding that can be applied to a resistance welding machine for welding a nut and a workpiece sandwiched between an upper and lower electrodes by energizing the electrodes.

BACKGROUND OF THE INVENTION

Conventional electrode structure for resistance welding utilized in a resistance welding machine can be found, for example, in Japanese Patent Application Publication No. H10-43870 as a movable-electrode structure in a resistance welding apparatus for nut. This electrode structure includes a movable electrode (upper electrode) and a fixed electrode (lower electrode) that are made of non-magnetic material and arranged vertically so as to face each other, and a guide pin of the movable electrode is inserted into a through-hole of a nut disposed between the electrodes to hold the nut.

After this holding, the movable electrode is lowered along with the nut to position the nut in a predetermined welding position of the workpiece on the fixed electrode. In this case, the electrode structure is configured as follows for preventing the nut from falling off the guide pin during the nut being lowered. That is, an air passage is formed inside the guide pin, and a plurality of air outlet holes communicating with the air passage are formed on a circumferential surface at an end (lower end) of the guide pin. Pressurized air is supplied to the air passage to blow air upward from the air outlet holes at the lower end to a lower surface of the nut, to prevent the nut from falling off.

SUMMARY OF THE INVENTION

Problems to be Solved

However, in the electrode structure of Japanese Patent Application Publication No. H10-43870, if the pressurized air is stopped while lowering the movable electrode with the nut, the nut will fall off the guide pin.

In addition, when lowering the movable electrode along with the nut to set the nut at a predetermined welding position of the workpiece on the fixed electrode, the nut may not always be set at the predetermined welding position of the workpiece, depending on the holding condition of the nut to the movable electrode and/or the setting condition of the workpiece on the fixed electrode. In other words, the nut may be set off the predetermined welding position of the workpiece to inhibit proper welding.

The present invention has been made in view of these circumstances to provide an electrode structure that allows a nut, detachably held to an upper electrode of a resistance welding machine, to be suitably adjusted and set at a predetermined welding position of the workpiece on a lower electrode without falling off on the way to the lower electrode.

Solution to Problem

As means for solving above problems, a first aspect of the present invention provides an electrode structure for resistance welding that can be applied to a resistance welding machine which energizes an upper and lower electrodes arranged so as to vertically face each other to weld a nut and a workpiece sandwiched between the upper and lower electrodes, and includes: an upper pin that has a magnet fixed thereto and is built in a cavity formed inside the upper electrode so as to be vertically movable to allow a front end portion of the upper pin to protrude downward from the upper electrode; and a lower pin that is arranged so as to face the upper pin and built in a cavity formed inside the lower electrode so as to be vertically moveable to allow a front end portion of the lower pin to protrude upward from the lower electrode and is, wherein, in a state where the front end portion of the upper pin protrudes downward from the upper electrode, the nut inserted onto the front end portion of the protruding upper pin is attracted and held by magnetic force of the magnet, and, in a state where the upper pin is pushed upward by the lower pin so that the magnet is separated from the nut by a predetermined distance, the nut comes off the upper pin and moves due to a less force for attracting the nut by the magnet, and then fitted onto the lower pin at a position higher than the position where the workpiece inserted onto the lower pin is set on the lower electrode.

This configuration allows for gaining following operational effects. When the upper pin is pushed upward by the lower pin while the front end portion of the lower pin is inserted into the through-hole of the nut, the magnet moves apart upward to apply a less force for attracting the nut to allow the nut to come off the upper pin and to be fitted onto the front end portion of the lower pin. The fitted nut is located above a workpiece inserted onto the lower pin at a distance. In this case, the nut and a through-hole in the workpiece are each fitted into the lower pin vertically at a distance, thus the central axes of the nut and the through-hole in the workpiece are vertically aligned with each other.

Here, it is assumed that the nut and the workpiece have their center axes being aligned and are in contact with each other at a predetermined welding position for both the nut and the workpiece. When the upper electrode is lowered from the state as described above, in which the center axes of the nut and the through-holes in the workpiece are vertically aligned with each other, to make the nut contact with the workpiece, the nut can be suitably set at the predetermined welding position on an upper surface of the workpiece because the center axes of the nut and the workpiece are vertically aligned with each other. In addition, when the upper electrode is lowered to depress the lower pin, the nut is fitted into an upper end of the lower pin and does not fall off during the lowering because the upper surface of the nut is pressed by a lower surface of the upper electrode.

Thus, the nut, which is removably held to the upper electrode of the resistance welding machine, can be suitably set at the predetermined welding position of the workpiece set on the lower electrode, without falling off on the way to the lower electrode.

A second aspect of the present invention is characterized in that the electrode structure according to the first aspect further includes a repulsive force generating arrangement that is arranged, above the upper pin, in the cavity of the upper electrode and generates a repulsive force pressing the upper pin downward as the upper pin moves upward.

This configuration allows the upper and lower pins to hold a state of contacting with each other at contacting ends and not to be separated, because the repulsive force generating arrangement generates the repulsive force to depress the upper pin as the upper pin is pushed upward by the lower pin. Therefore, this allows for eliminating problems such that the contacting ends of the upper and lower pins are separated to cause the nut to fall off, or a position of the nut to be displaced to inhibit the nut to be fitted into the end of the lower pin.

A third aspect of the present invention is characterized in that, in the electrode structure according to the first or second aspect, the magnet fixed to the upper pin has an annular shape and is inserted onto the upper pin.

With this configuration, in the state where the front end portion of the upper pin protrudes downward from the upper electrode, the nut inserted onto the protruding end of the upper pin is attracted and held by the magnetic force of the magnet to have following operational effects, because the magnet is formed in an annular shape. As the annular magnet is inserted onto the upper pin, the magnetic force of the annular magnet is applied to the entire surface, which faces the magnet, of the nut inserted below the magnet onto the front end portion of the upper pin. Therefore, the nut can be attracted and held to the upper electrode stronger than in other cases.

A fourth aspect of the present invention is characterized in that, in the electrode structure according to any one of the first to third aspects, the magnet contacts on a bottom surface in the cavity of the upper electrode in a state where the front end portion of the upper pin protrudes downward from the upper electrode, while the magnet is apart from the bottom surface in the cavity in a state where the upper pin is pushed upward so that the front end portion of the upper pin does not protrude downward from the upper electrode.

With this configuration, when the magnet is in contact with the bottom surface in the cavity of the upper electrode, the upper electrode is magnetized to attract and surely hold the nut inserted onto the upper pin protruding from the upper electrode by the stronger magnetic force than in other cases. In addition, when the magnet is separated from the bottom surface of the upper electrode as the upper pin moves higher, the magnet is separated from the nut to apply a less force for attracting the nut and fails to hold the nut.

Advantageous Effects of the Invention

According to the present invention, an electrode structure is provided that allows a nut, which is detachably held to the upper electrode of the resistance welding machine, to be suitably set at a predetermined welding position of the workpiece on the lower electrode, without causing the nut to fall off on the way to the lower electrode.

BRIEF DESCRIPTION OF DRAWINGS

FIG. 1A is a cross-sectional side view showing the nut supplying and welding structure in part, FIG. 1B is an enlarged view of a portion A in FIG. 1A, partially showing the upper and lower electrodes as well as a front end portion of a nut chuck of the nut feeding apparatus, and FIG. 1C is a plan view of a nut guide fixed on the nut chuck shown in FIG. 1B;

FIG. 2A is a perspective view showing the external shape of the weld nut, FIG. 2B is a plan view of the weld nut, and FIG. 2C is a side view of the weld nut;

FIG. 4A is a partial cross-sectional side view of the nut feeding apparatus in which the front rod is extended;

FIG. 7A shows a partial cross-sectional view of a state in which the lower guide pin is in contact with the upper guide pin, FIG. 7B shows a partial cross-sectional view of a state in which the lower guide pin pushes the upper guide pin upward, and FIG. 7C shows a partial cross-sectional view of a state in which the weld nut is in contact with the workpiece;

FIG. 8A shows a partial cross-sectional view of a state in which the lower guide pin is in contact with the upper guide pin, FIG. 8B shows a partial cross-sectional view of a state in which the lower guide pin pushes the upper guide pin upward, and FIG. 8C shows a partial cross-sectional view of a state in which the weld nut is in contact with the workpiece.

EMBODIMENTS OF THE INVENTION

Hereinafter, embodiments of the present invention will be described with reference to the drawings.

Configuration

Figure 1A:
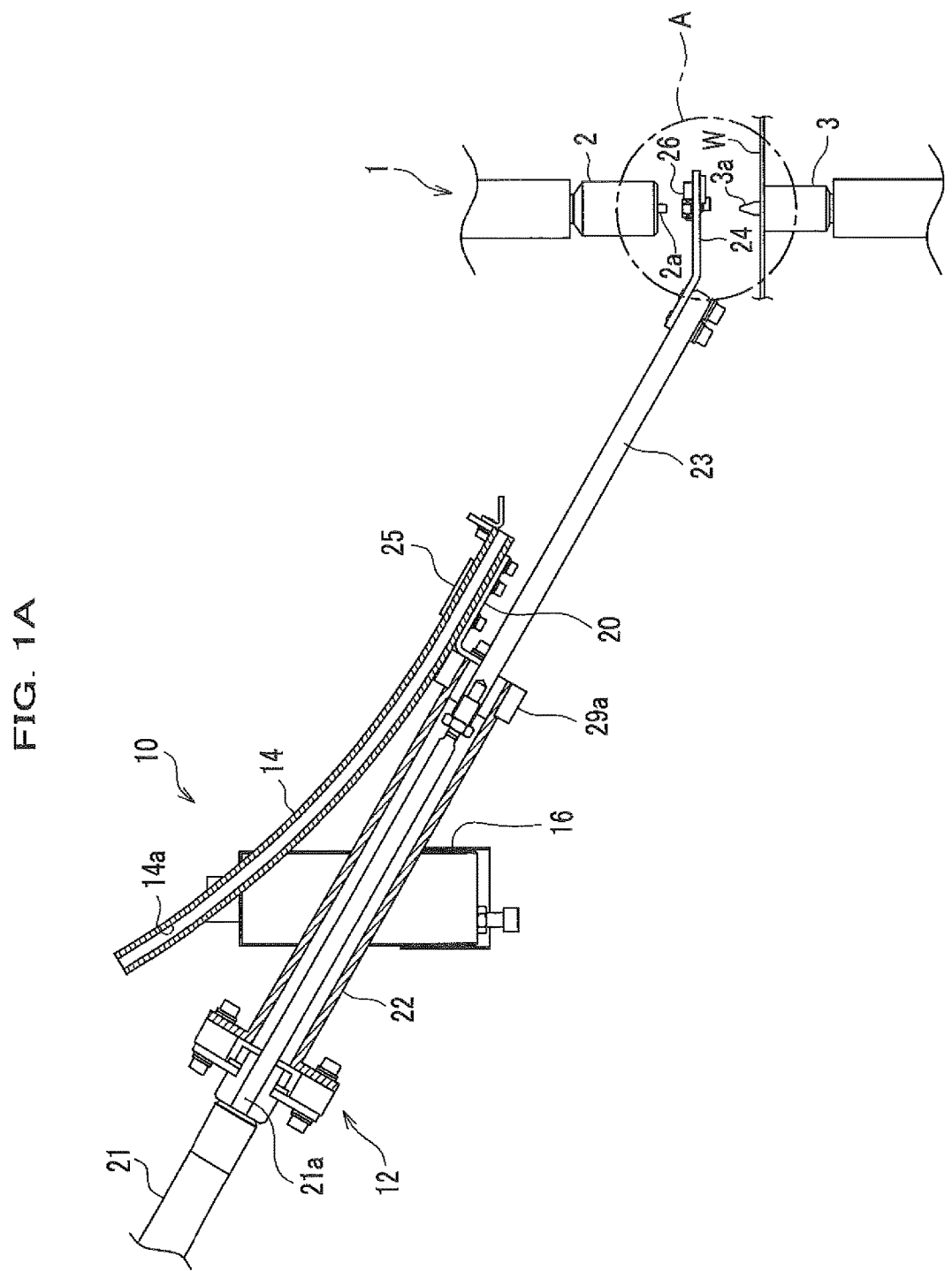
FIGS. 1A-1C show a nut supplying and welding structure inclusive of an upper and lower electrodes of an electrode structure for resistance welding according to an embodiment of the present invention, and a nut feeding apparatus, where
Figure 1B:
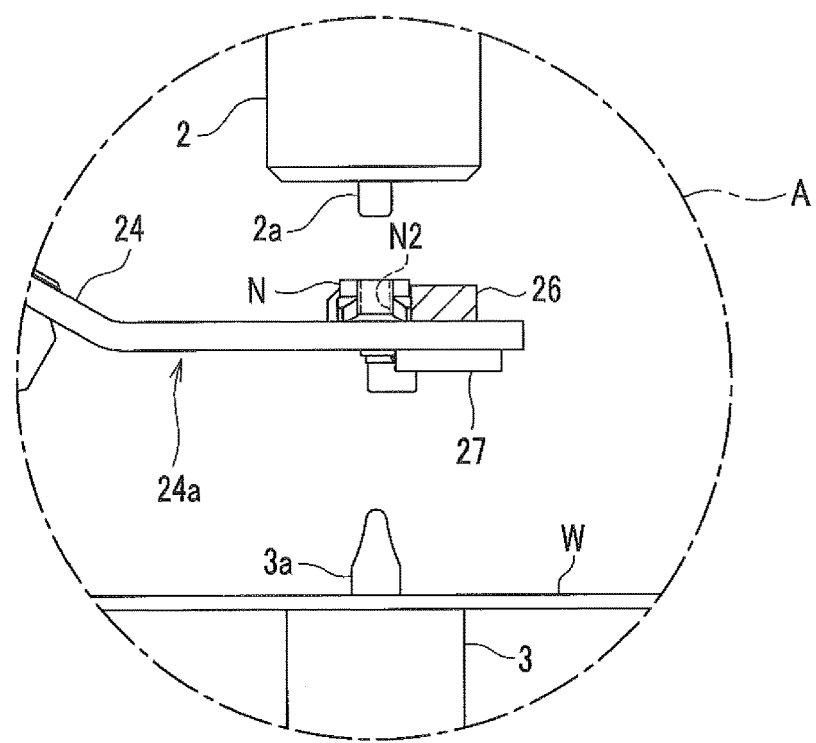
Figure 1C:
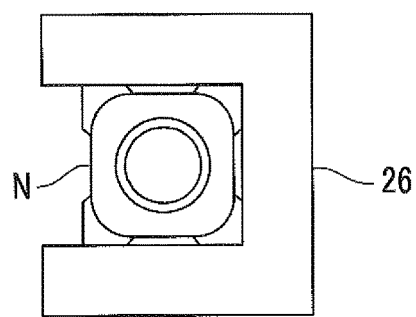

FIGS. 1A-1C show a nut supplying and welding structure inclusive of an upper and lower electrodes of an electrode structure for resistance welding according to an embodiment of the present invention, and a nut feeding apparatus, where FIG. 1A is a cross-sectional side view showing the nut supplying and welding structure in part, FIG. 1B is an enlarged view of a portion A in FIG. 1A, partially showing the upper and lower electrodes as well as a front end portion of a nut chuck of the nut feeding apparatus, and FIG. 1C is a plan view of a nut guide fixed on the nut chuck shown in FIG. 1B.

As shown in FIG. 1A, a resistance welding machine 1 includes an upper electrode 2 and a lower electrode 3 that vertically face to each other. As shown in FIG. 1B, the upper electrode 2 is provided on its lower surface with an upper guide pin 2a (also referred to as an upper pin or a pin) onto which a weld nut N is inserted. The lower electrode 3 is provided on its upper surface with a lower guide pin 3a (also referred to as a lower pin or a pin) on which a workpiece W such as a metal plate is set. The workpiece W has a through-hole to be inserted onto the lower pin 3a for the workpiece W being set on the lower electrode 3. This setting is done by a person or a robot. It should be noted that the pin 2a is a non-magnetic and insulating body, and the pin 3a is an insulating body.

Both the upper electrode 2 and the lower electrode 3 are arranged in the initial state, as shown in FIG. 1A, to be spaced by a predetermined distance and to vertically face to each other, and a nut chuck 24 of a nut feeder 10 is laterally inserted between the electrodes, to be arranged at a predetermined position.

The nut feeder 10 feeds the weld nut N, as shown in FIG. 1A, to the upper electrode 2 of the resistance welding machine 1. The nut feeder 10 includes a nut feed reciprocating member (also referred to as a reciprocating member) 12 in an elongated shape that is arranged at an angle, a nut delivery tube (also referred to as a tube) 14 that is assembled at an angle above the reciprocating member 12, and a lifting drive member 16.

Figure 2A:
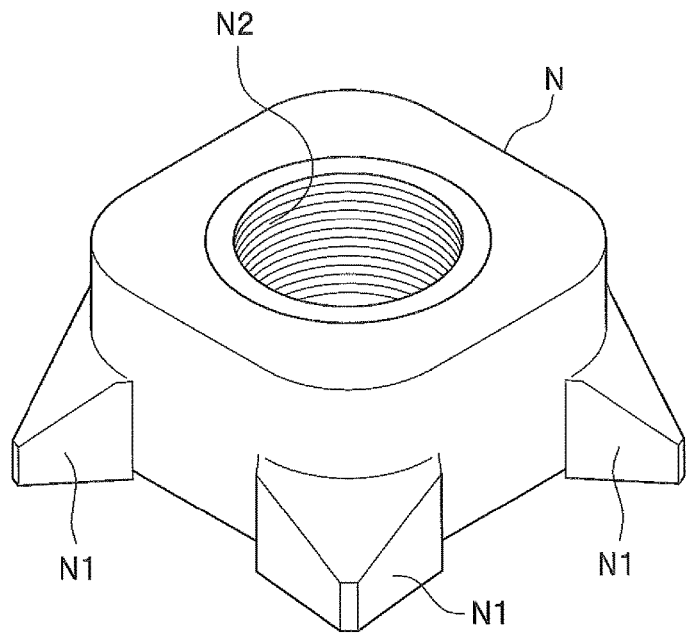
FIGS. 2A-2C show a weld nut, where
Figure 2B:
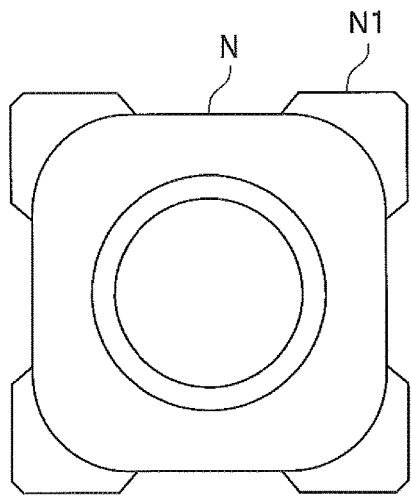
Figure 2C:
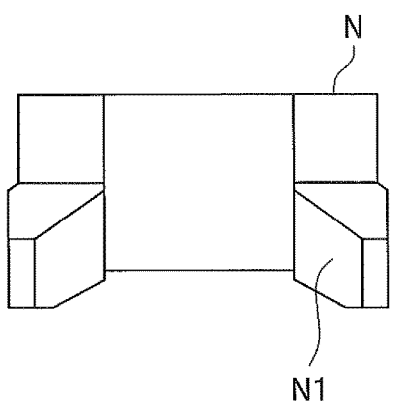

Here, the weld nut N has an outer shape of substantially rectangular parallelepiped shape, as shown in the perspective view of FIG. 2A, and has protrusions N1 protruding at four lower corners of the rectangular parallelepiped shape, as also shown in the plan view in FIG. 2B and the side view in FIG. 2C. Each protrusion N1 is welded to the workpiece W set on the lower electrode 3 shown in FIG. 1B. In addition, a screw hole (through-hole) N2 that vertically penetrates the nut is formed in the center of the rectangular parallelepiped shape, as shown in FIG. 2A.

The nut feed reciprocating member 12 shown in FIG. 1A is configured to include an air cylinder 21 in a tubular shape, a guide cylinder 22 in a tubular shape, a forefront rod 23 in a rod shape, and a nut chuck 24. The air cylinder 21 and the guide cylinder 22 are connected to each other to have an elongated shape, and the forefront rod 23 is inserted into the guide cylinder 22 so as to be movable (reciprocatable) in the longitudinal direction. The forefront rod 23 in FIG. 1A has moved forward in the most extended state. By contrast, the forefront rod 23 in FIG. 3A has moved backward in the most shortened state.

Figure 3A:
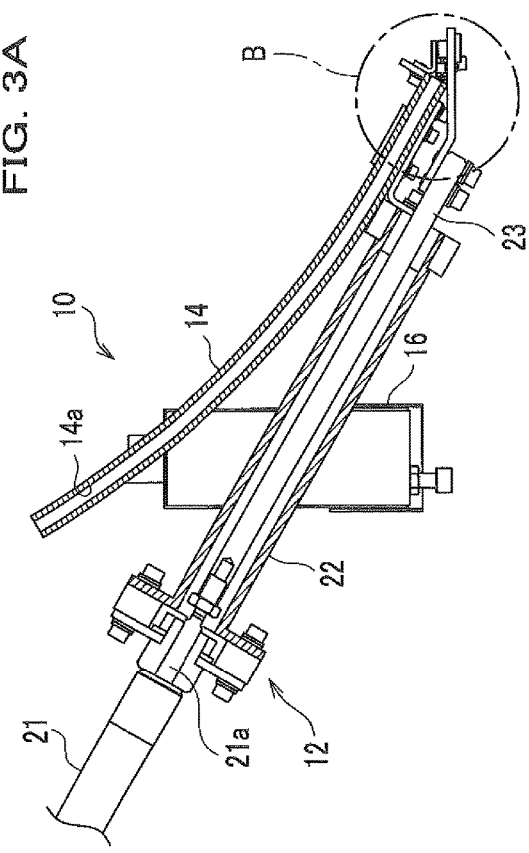
FIG. 3A is a partial cross-sectional side view of the nut feeding apparatus in which a front rod is retracted.

A piston rod 21a fixed to a piston (not shown) at one end is incorporated inside the air cylinder 21 shown in FIG. 3A, and also movably inserted inside the guide cylinder 22. In addition, the piston rod 21a is connected to the forefront rod 23 at the other end. The piston moves back and forth as air in the air cylinder 21 is compressed or evacuated, to move the piston rod 21a back and forth. According to this movement, the forefront rod 23 moves forward or backward so as to be extended or shortened.

Returning to FIG. 1A, the nut chuck 24 fixed to the front end portion of the forefront rod 23 is bent at a predetermined position apart from the fixed portion, and the bent portion is horizontal to form a horizontal surface 24a. When the forefront rod 23 moves forward in the most extended state, the horizontal surface 24a is arranged between the upper electrode 2 and the lower electrode 3 of the resistance welding machine 1. On this occasion, as the resistance welding machine 1 is installed on the floor, the upper electrode 2 and the lower electrode 3 which vertically face to each other are accordingly arranged perpendicular to the horizontal surface 24a.

Further, as shown in FIG. 1B, the horizontal surface 24a has a nut guide 26 in a U-shape (see FIG. 1C), in which the weld nut N is placed, fixed on its upper surface, and has a permanent magnet (magnet) 27 fixed on its lower surface at a position corresponding to the nut guide 26. The nut guide 26 is intended for receiving the weld nut N, and the weld nut N received is attracted and held by the magnetic force of the magnet 27.

Figure 3B:
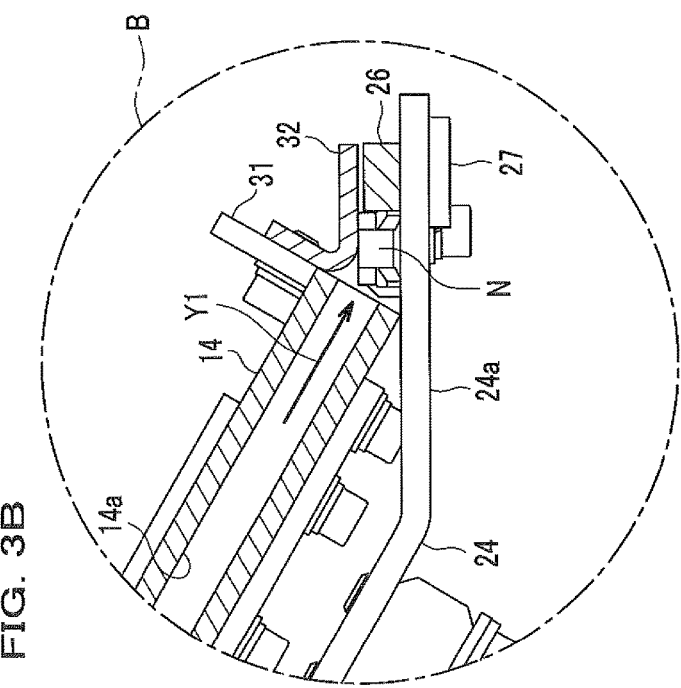
FIG. 3B is an enlarged view of a portion B in FIG. 3A, partially showing the nut chuck and a nut delivery tube that are fixed to the front end portion of the front rod.

Next, the nut delivery tube 14 in FIG. 1A delivers the weld nut N to the nut guide 26 of the nut chuck 24 at regular intervals by air pressure from a compressor (not shown). The tube 14 is fixed to a clamp 29a, which is secured to the outer circumferential surface of the front end portion of the guide cylinder 22, with a fixing member 20 and a tube holder 25. In addition, the tube 14 is a cross-sectionally rectangular tube having a cavity 14a, of which both ends are open. As indicated by an arrow Y1 in FIG. 3B, the weld nut N slides (moves) downward within the tube 14 to be received by the nut guide 26. On this occasion, an L-shaped plate 32, which is fixed by a fixing member 31 to an upper surface of an opening at the end of the tube 14, prevents the weld nut N from bouncing out upward.

Next, the lifting drive member 16 is used for lifting and lowering the nut feed reciprocating member 12 as a whole in a following manner. For example, the nut chuck 24 of the nut feed reciprocating member 12 is assumed to be arranged between the upper electrode 2 and the lower electrode 3, as shown in FIG. 1A. On this occasion, the screw hole N2 of the weld nut N is located just below the upper pin 2a protruding from the lower surface of the upper electrode 2, as shown in FIG. 1B.

Figure 4B:
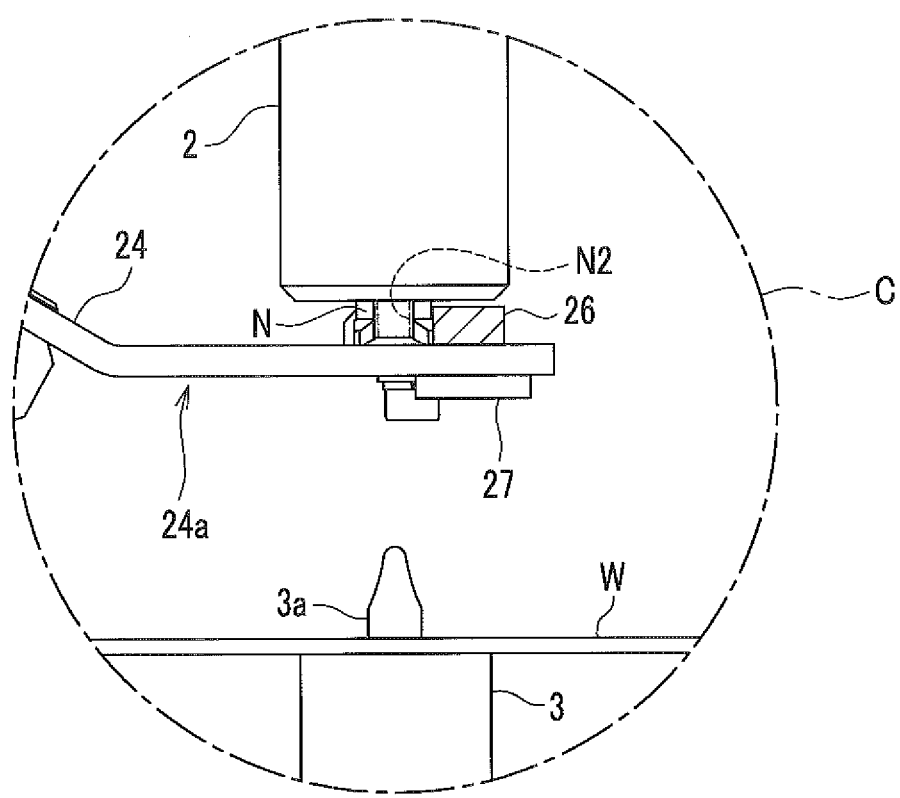
FIG. 4B is an enlarged view of a portion C in FIG. 4A, showing a state when the weld nut, which is on the nut chuck and fixed to the front end portion of the front rod, is inserted onto a guide pin of the upper electrode.

In this state, when the lifting drive member 16 lifts the nut feed reciprocating member 12, the weld nut N held in the nut guide 26 is inserted onto the upper pin 2a through the screw hole N2, as shown in FIGS. 4A and 4B. The inserted weld nut N is attracted and held by the magnetic force of a permanent magnet 40 (see FIG. 6) built in the upper electrode 2. At this point, the weld nut N is also attracted and held by the magnet 27 on the lower surface of the nut chuck 24.

Figure 5A:
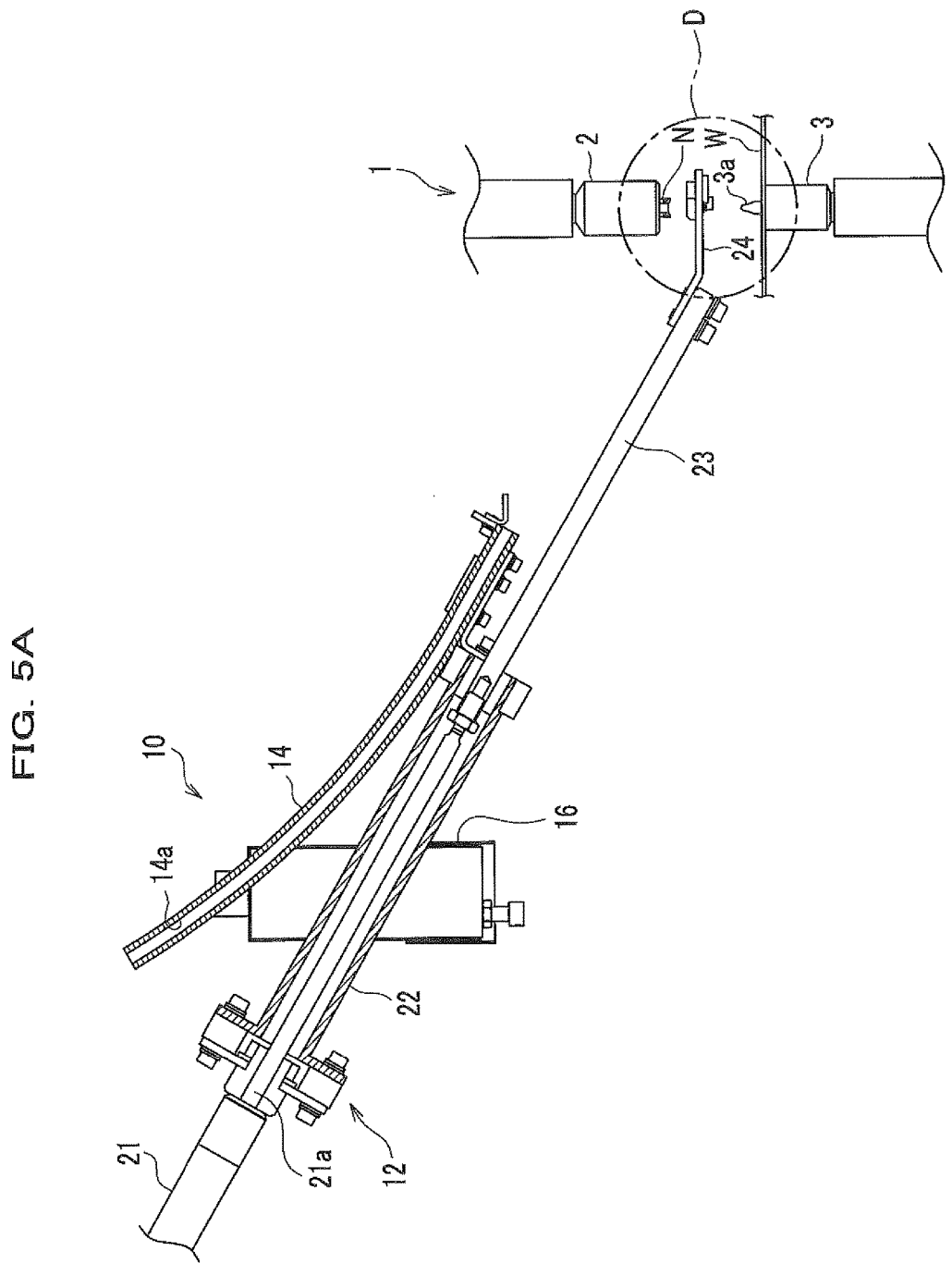
FIG. 5A is a partial cross-sectional side view of the nut feeding apparatus in which the front rod is extended.
Figure 5B:
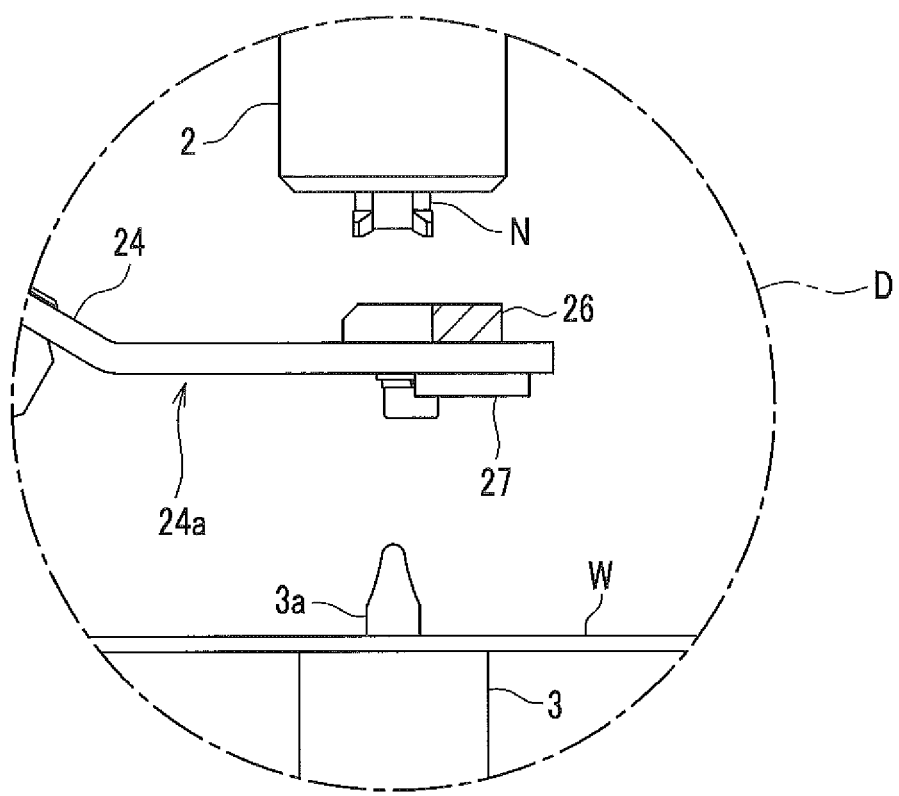
FIG. 5B is an enlarged view of a portion D in FIG. 5A, showing a state when the nut chuck fixed to the front end portion of the front rod is separated downward from the upper electrode.

When the lifting drive member 16 lowers the nut feed reciprocating member 12 from this state, the weld nut N is separated from the nut chuck 24 to be inserted onto and held to the upper pin 2a of the upper electrode 2, as shown in FIGS. 5A and 5B. This is caused by the magnetic force of the magnet 40 (see FIG. 6) built in the upper electrode 2 being stronger than the magnetic force of the magnet 27 on the lower surface of the nut chuck 24 by a given amount or more. That is, in the case of lowering the nut chuck 24 from the upper electrode 2, as the magnet 40 at a higher position has stronger magnetic force than the magnet 27 at a lower position, the weld nut N is separated from the magnet 27 at a lower position to remain being attracted by and held to the magnet 40 at a higher position. In addition, the magnet 40 and the magnet 27 are assembled to repel each other for facilitating the hold by the magnet 40.

Figure 6:
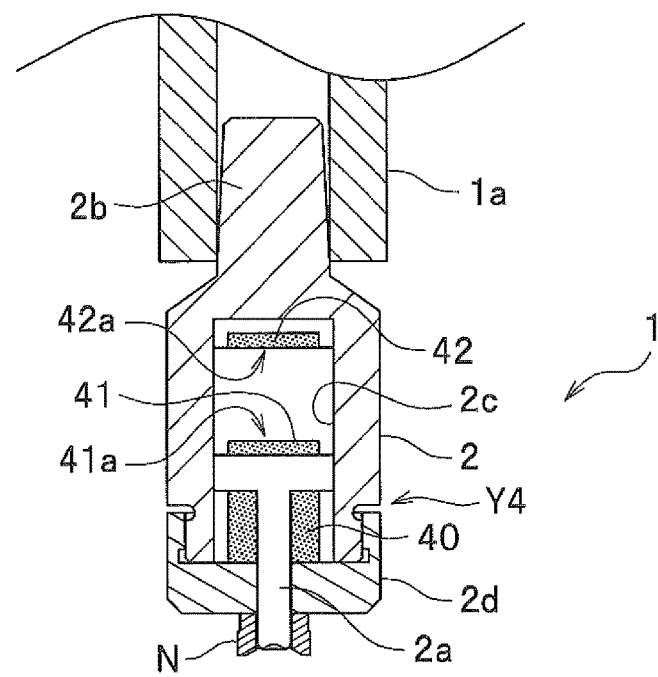
FIG. 6 is a partial cross-sectional view of the upper and lower electrodes in a state where the weld nut is inserted onto and held to an upper guide pin of the upper electrode of the resistance welding machine according to the present embodiment.
Figure 6:
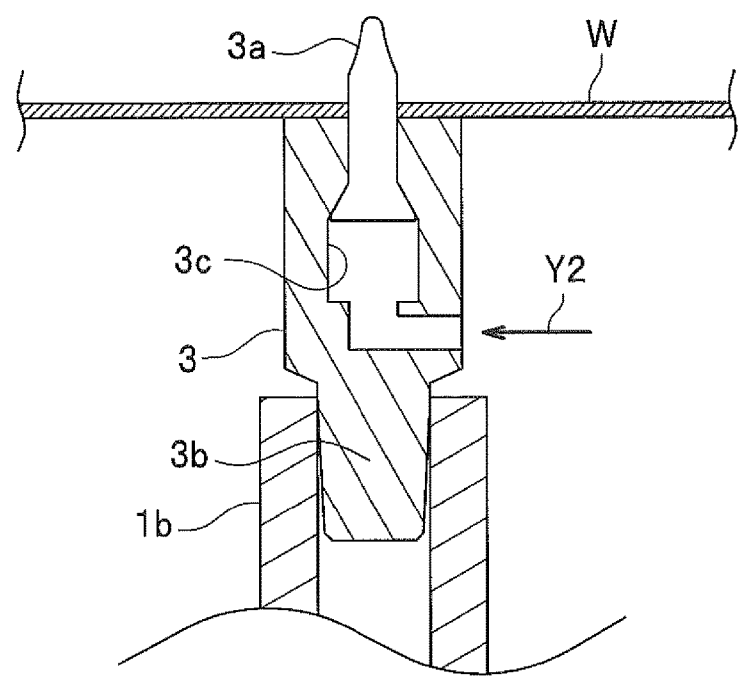
Figure 7A:
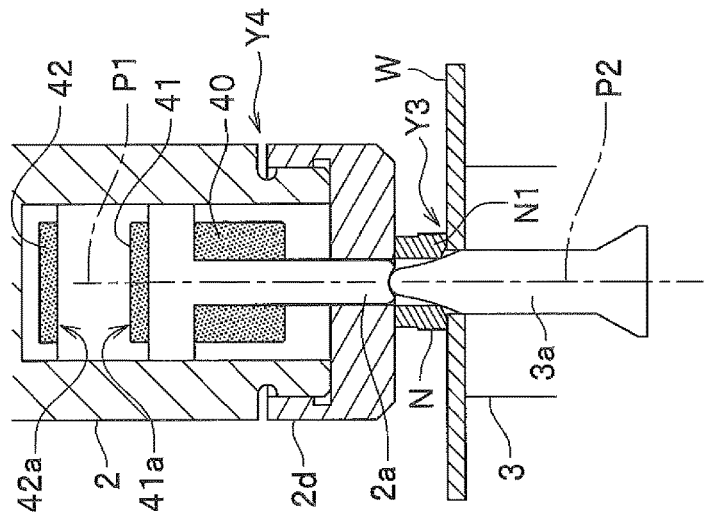
FIGS. 7A-7C each show a transitional state of the weld nut, starting from a state in which the nut is inserted onto and held to the upper guide pin of the upper electrode of the resistance welding machine according to the present embodiment, and the axes of the upper guide pin and a lower guide pin are aligned with each other, where
Figure 7B:
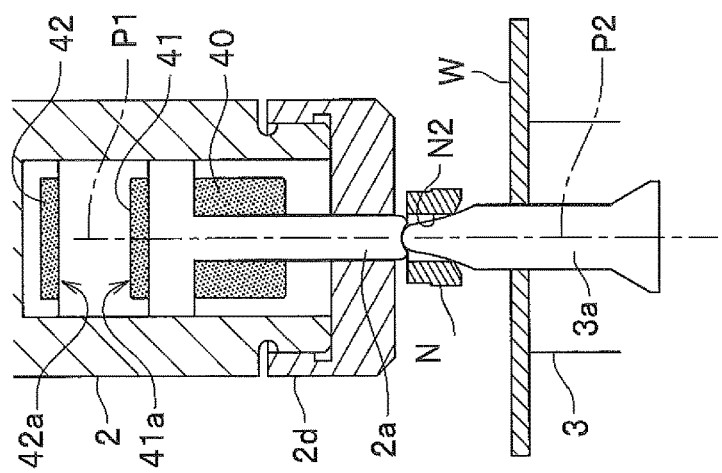
Figure 7C:
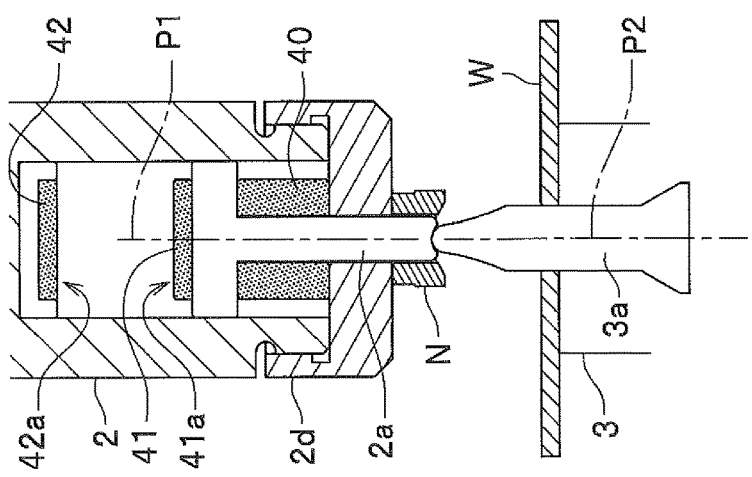

A cross-sectional view is shown in FIG. 6 of the upper electrode 2 and the lower electrode 3 in the state of the weld nut N being inserted onto and held to the upper pin 2a of the upper electrode 2, as described above. In addition, partial cross-sectional views are shown in FIGS. 7A-7C of the electrodes when the upper pin 2a and the lower pin 3a have their axes P1, P2 being aligned with each other and are in contact with each other.

As shown in FIG. 6, the upper electrode 2 has an upper end 2b convexly protruding upward fitted in and fixed to a concave upper-electrode holding member 1a of the resistance welding machine 1. The upper electrode 2 has a cylindrical cavity 2c internally below the upper end 2b and is open at the lower end. An electrode member 2d in a cap shape is fitted to the upper electrode 2 on the opening side by a fitting structure indicated by an arrow Y4. The electrode member 2d is formed with a through-hole for movably inserting a lower end portion (front end portion) of the upper pin 2a. In addition, the electrode portion 2d, as being worn due to welding operation of the resistance welding machine 1, is replaceable by way of the fitting structure indicated by the arrow Y4.

The upper pin 2a is in a cross-sectionally T-shape, with a laterally-elongated portion (disc portion) in a cross-sectional view on the upper side assembled in the cavity 2c movably in the vertical direction, and with a vertically-elongated lower end portion in a cross-sectionally T-shape inserted in the through-hole of the electrode member 2d movably in the vertical direction. In addition, the permanent magnet 40 is assembled to a portion, in the cavity 2c and having a cross-sectionally T-shape, of the upper pin 2a.

The magnet 40 is in an annular shape and inserted onto and fixed to the elongated rod portion of the upper pin 2a. Here, the magnet 40 is also referred to as a ring magnet 40. The ring magnet 40 is vertically moved integrally with the upper pin 2a, which is pushed upward by the lower pin 3a, as shown in FIGS. 7A and 7B.

A permanent magnet 41 (also referred to as a lower magnet 41) is mounted on and fixed to the upper surface of the disc portion on the upper side of the upper pin 2a. Further, a permanent magnet 42 (also referred to as an upper magnet 42) is fixed on the upper side of the cavity 2c, as shown in FIG. 6, apart from the lower magnet 41. A lower surface 42a of the upper magnet 42 has the same polarity (for example, S-pole) as an upper surface 41a of the lower magnet 41. As the lower magnet 41 moves upward along with the upper pin 2a to come closer to the upper magnet 42, the repulsive force increases between the magnets 41 and 42. It should be noted that the lower magnet 41 and the upper magnet 42 constitute a repulsive force generating arrangement as will be claimed.

The upper pin 2a is pressed downward by the repulsive force, to keep a state in which the end of the upper pin 2a is in contact with the end of the lower pin 3a. In addition, a force for pushing the lower pin 3a upward by an air pressure indicated by an arrow Y2 is overwhelmingly stronger than the repulsive force for pressing the upper pin 2a downward, as will be described later. The imbalance of the forces causes the lower pin 3a to push the upper pin 2a upward as shown in FIG. 7B.

When the upper electrode 2 is lowered in such a state that the upper pin 2a and the lower pin 3a are in contact with each other, the low end surface of the upper electrode 2 contacts the weld nut N, and, in this state, the weld nut N is pushed downward to a state where the weld nut N is in contact with the upper surface of the workpiece W, as shown in FIG. 7C. It should be noted that, instead of lowering the upper electrode 2, the lower electrode 3 can be moved upward so that the weld nut N is in contact with the upper surface of the workpiece W as described above.

As shown in FIG. 6, a cavity 3c, in which the lower pin 3a is vertically movable, is formed inside an upper portion of the lower electrode 3 having a lower end 3b convexly protruding downward. The cavity 3c communicates with a side hole which opens on the side surface of the lower electrode 3, and a through-hole opens above the cavity 3c for the lower pin 3a externally protruding upward. When the air is blown into the side hole of the cavity 3c by a compressor (not shown), as indicated by an arrow Y2, the lower pin 3a is lifted by this air pressure and held in a state where the end of the lower pin 3a protrudes from the through-hole above the cavity 3c.

The lower pin 3a has an upper end portion (front end portion) in a conical shape, a body portion which continues downward from the front end portion and is in a cylindrical shape, and a lower end portion (base end portion) which continues downward from the body portion and is in a shape gradually and radially widening downward. The lower pin 3a is vertically and movably inserted in the cavity 3c of the lower electrode 3, and has its upward movement restricted by the base end portion. The lower electrode 3 having the lower pin 3a built in this way has the lower end 3b, convexly protruding downward, fitted and fixed to a lower-electrode holding portion 1b, in a concave shape, of the resistance welding machine 1.

On the other hand, the annular magnet 40 of the upper electrode 2, when positioned at the lowermost end in the cavity 2c, attracts and holds the weld nut N which is inserted onto the upper pin 2a by the magnetic force of the annular magnet 40. However, as shown in FIG. 7B, when the annular magnet 40 is apart by a predetermined distance according to the rising of the upper pin 2a, the annular magnet 40 is separated from the weld nut N to apply a less force for attracting the weld nut N to fail to hold the weld nut N. This allows the weld nut N to come off the upper pin 2a and drop (move), to be fitted onto the front end portion, in a conical shape, of the lower pin 3a on the lower side. The fitting position is higher above the workpiece W. It should be noted that the lower pin 3a may move upward to cause the front end portion of the lower pin 3a to fit into the weld nut N. In this case, relatively speaking, the weld nut N is moved to the front end portion of the lower pin 3a.

Operation

Next, a description will be given of operation using the upper electrode 2 and the lower electrode 3 having the electrode structure for resistance welding according to the present embodiment, to make the weld nut N contact with the workpiece W at a predetermined welding position.

Note, however, that the weld nut N is assumed to be inserted onto and held to the upper pin 2a of the upper electrode 2, as shown in FIG. 6, by the nut feeder 10 in FIG. 4A. In addition, it is also assumed that air is blown by a compressor (not shown) through the side hole of the lower electrode 3 to the cavity 3c, as indicated by the arrow Y2, to lift the lower pin 3a upward so as to be held in a state where the upper end protrudes from the lower electrode 3.

The upper electrode 2 in the state shown in FIG. 6 is lowered as shown in FIG. 7A to make the end of the upper pin 2a contact with the end of the lower pin 3a. In this state, the axis P1 of the upper pin 2a and the axis P2 of the lower pin 3a are assumed to be aligned with each other. From this state, the upper electrode 2 is further lowered to allow the front end portion of the lower pin 3a to push the upper pin 2a upward and come into the screw hole N2 of the weld nut N, as shown in FIG. 7B. In this case, the annular magnet 40 is also moved upward integrally with the upper pin 2a.

In this state, the annular magnet 40 is separated from the weld nut N by a predetermined distance, as well as from the cap portion 2d, to apply a less force for attracting the weld nut N, and then the weld nut N comes off the upper pin 2a to drop and fit onto the front end portion, in a conical shape, of the lower pin 3a. It should be noted that, in the course of the upper pin 2a being moved upward, the lower magnet 41 comes closer to the upper magnet 42 to have the stronger repulsive force. This allows the upper pin 2a and the lower pin 3a to hold a state of contacting with each other at the ends and not to be separated from each other.

Here, if there is no repulsive force, problems may occur such that the upper pin 2a jerks upward when pushed upward by the lower pin 3a to cause the weld nut N to come off and drop, or the weld nut N is displaced to inhibit itself from being inserted onto the front end portion of the lower pin 3a. However, according to the present embodiment, the upper pin 2a and the lower pin 3a hold the state of contacting with each other at the ends by the repulsive force, as described above, to prevent such a malfunction from occurring.

In addition, when the weld nut N is suitably fitted to the front end portion of the lower pin 3a, the central axis of the weld nut N is aligned with the axis P2 of the lower pin 3a. In this case, the central axis of the through-hole in the workpiece W penetrated by the lower pin 3a in advance is aligned with the axis P2 of the lower pin 3a. This causes a state in which the central axes of the screw hole N2 of the weld nut N and the through-hole of the workpiece W are each aligned with the axis P2 of the lower pin 3a.

Here, the welding nut N and the workpiece W, when the weld nut N is placed on the upper surface of the workpiece W so that their central axes are aligned with each other, are assumed that the respective protrusions N1 at the four lower corners of the weld nut N are set to predetermined welding positions on the upper surface of the workpiece W.

Accordingly, when the upper electrode 2 is further lowered from the state in FIG. 7B to allow the lower pin 3a to push the upper pin 2a upward, as shown in FIG. 7C, the respective protrusions N1 at the four lower corners of the weld nut N are set to the predetermined welding positions on the upper surface of the workpiece W, because the central axes of the weld nut N and the workpiece W are each aligned with the axis P2 of the lower pin 3a. When welding is made by the resistance welding machine 1 in this set state, the weld nut N is suitably welded to the predetermined position on the workpiece W. In addition, when the upper electrode 2 is vertically separated after welding from the lower electrode 3, the upper pin 2a protrudes downward from the upper electrode 2 by the repulsive force of the magnets 40, 42 in the upper electrode 2.

Figure 8A:
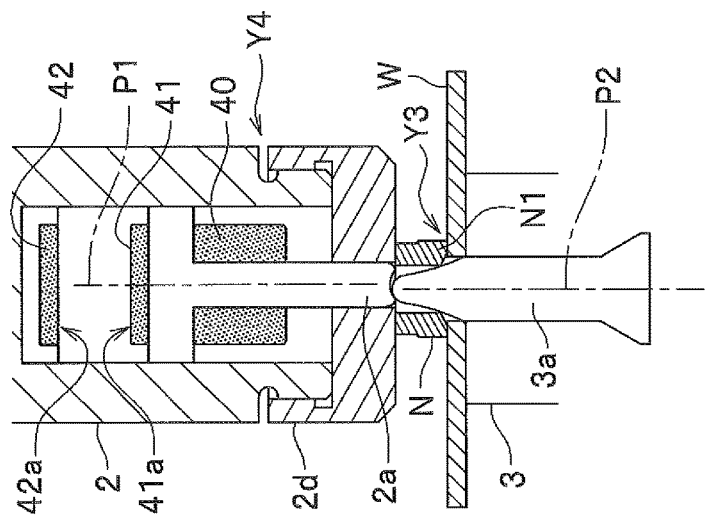
FIGS. 8A-8C each show a transitional state of the weld nut, starting from a state in which the nut is inserted onto and held to the upper guide pin of the upper electrode of the resistance welding machine according to the present embodiment, and the axes of the upper guide pin and the lower guide pin are unaligned with each other, where

Next, the axis P1 of the upper pin 2a and the axis P2 of the lower pin 3a are assumed to be unaligned with each other, when the upper electrode 2 in FIG. 6 is lowered as shown in FIG. 8A to make the end of the upper pin 2a contact with the end of the lower pin 3a.

Figure 8B:
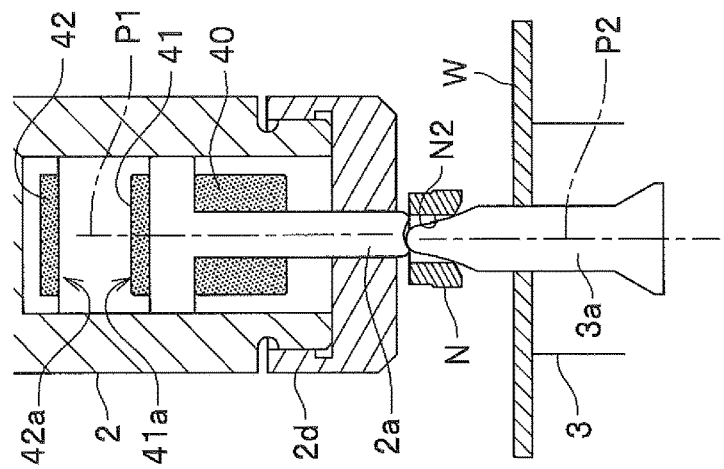

When the upper electrode 2 is lowered in a state where the axis P1 and the axis P2 are unaligned with each other, the front end portion of the lower pin 3a pushes the upper pin 2a upward to slide into the screw hole N2 of the weld nut N, as shown in FIG. 8B. In this case, the annular magnet 40 is pushed upward together with the upper pin 2a to apply a less magnetic force as described above, causing the weld nut N to fall off the upper pin 2a and be fitted onto the front end portion of the lower pin 3a.

That is, the weld nut N can come off the upper pin 2a to fit onto the lower pin 3a even in a state where the axis P1 of the upper pin 2a and the axis P2 of the lower pin 3a are unaligned with each other. This makes the central axis of the weld nut N be aligned with the axis P2 of the lower pin 3a. Therefore, the weld nut N and the workpiece W are each fitted to the lower pin 3a in a vertically separated state, to make each of the central axes of the screw holes N2 of the weld nut N and the through-hole of the workpiece W be aligned with the axis P2 of the lower pin 3a.

Figure 8C:
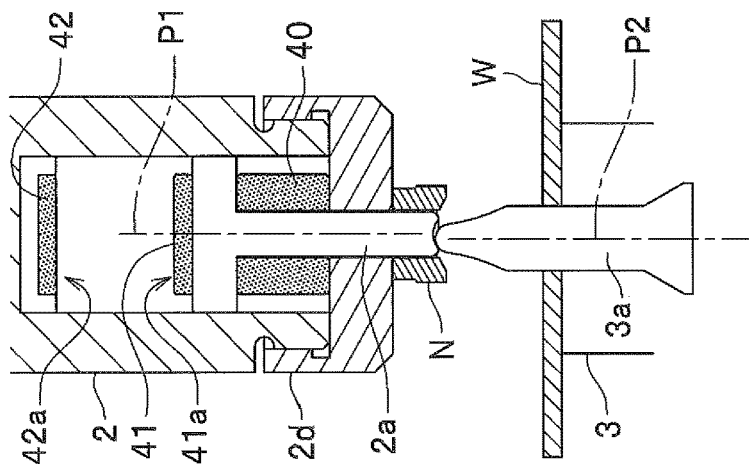

In this state, when the upper electrode 2 is further lowered to push the lower pin 3a downward, as shown in FIG. 8C, the protrusions N1 at four lower corners of the weld nut N come in contact with the predetermined welding position on the upper surface of the workpiece W, because each of the central axes of the weld nut N and the workpiece W is aligned with the axis P2 of the lower pin 3a. Welding by the resistance welding machine 1 in this contacting state allows the weld nut N to be suitably welded to the workpiece W at the predetermined position.

ADVANTAGEOUS EFFECTS

As described above, the electrode structure for resistance welding according to the present embodiment is applied to the resistance welding machine 1 that welds the weld nut N and the workpiece W sandwiched between the upper electrode 2 and the lower electrode 3 vertically arranged to face to each other, by energizing the electrodes 2, 3.

The present embodiment is characterized in that the upper pin 2a having the magnet (permanent magnet) 41 fixed thereto is arranged inside the cavity 2c formed within the upper electrode 2 so as to allow the front end portion of the upper pin 2a to protrude downward from the upper electrode 2 in a vertically movable state. In addition, the lower pin 3a is arranged inside the cavity 3c formed within the lower electrode 3 so as to face the upper pin 2a, as well as to allow the front end portion of the lower pin 3a to protrude upward from the lower electrode 3 in a vertically movable state.

Further, a configuration is made such that, in a state where the front end portion of the upper pin 2a protrudes downward from the upper electrode 2, the weld nut N inserted onto the protruding front end portion of the upper pin 2a is attracted and held by the magnetic force of the magnet 40. Furthermore, a configuration is made such that, in a state where the upper pin 2a is pushed upward by the lower pin 3a so that the magnet 40 is separated from the weld nut N by a predetermined distance, the weld nut N comes off the upper pin 2a and drops due to a less force for attracting the weld nut N by the magnet 40, and then the dropped weld nut N is fitted onto the lower pin 3a at a position higher than the position where the workpiece W inserted onto the lower pin 3a is set on the lower electrode 3.

With this configuration, following advantageous effects can be gained. It is assumed that the workpiece W inserted through its through-hole onto the lower pin 3a is set on the lower electrode 3, and the weld nut N inserted onto the front end portion of the upper pin 2a is attracted and held to the upper electrode 2 by the magnetic force of the magnet 40. On this occasion, when the upper pin 2a is pushed upward by the lower pin 3a while the front end portion of the lower pin 3a is inserted into the through-hole of the weld nut N, the magnet 40 moves away upward accordingly to apply a less force for attracting the weld nut N, and then the weld nut N comes off the upper pin 2a to be fitted onto the front end portion of the lower pin 3a. The weld nut N is fitted onto the lower pin 3a at a distance above the workpiece W inserted onto the lower pin 3a. In this case, the weld nut N and the workpiece W are fitted, vertically separated, through the respective through-holes onto the lower pin 3a to make the central axes of the through-holes of the weld nut N and the workpiece W be vertically aligned with each other.

Here, it is assumed that both the weld nut N and the workpiece W have the central axes aligned with each other and are in contact with each other at predetermined welding positions for both. When the upper electrode 2 is lowered to make the weld nut N contact with the workpiece W, from a state where the central axes of the through-holes of the weld nut N and the workpiece W are vertically aligned with each other as described above, the weld nut N can be suitably set to a predetermined welding position on the upper surface of the workpiece W, because the central axes of the through-holes of the weld nut N and the workpiece W are each vertically aligned with the central axis of the lower pin 3a. It should be noted that, when the lower pin 3a is pushed downward, the weld nut N is fitted onto the upper end portion of the lower pin 3a and the upper surface of the weld nut N is pressed against the lower surface of the upper electrode 2a, preventing the weld nut N from dropping while being moved downward.

When the upper electrode 2 and the lower electrode 3 are energized to do welding in this state, the weld nut N can be suitably weld to the workpiece W at the predetermined position.

In addition, the lower magnet 41 and the upper magnet 42 are further included on the upper pin 2a in the cavity of the upper electrode 2 as a repulsive-force generating arrangement that generates a stronger repulsive force for pressing the upper pin 2a downward as the upper pin 2a is moved higher. Facing surfaces of the lower magnet 41 and the upper magnet 42 have the same polarity (S-pole, for example) to generate a repulsive force, when the upper pin 2a is pushed upward by the lower pin 3a, that pushes the upper pin 2a downward toward the opposite direction from the direction of pushing upward.

According to this configuration, when the upper pin 2a is pushed upward by the lower pin 3a, the lower magnet 41 comes close to the upper magnet 42 integrally with the upper pin 2a, to cause the repulsive force to be generated between the upper magnet 42 and lower magnet 41. That is, the repulsive force for pressing the upper pin 2a downward is generated to allow the upper pin 2a and the lower pin 3a to hold a state of contacting with each other at the contacting ends and not to be separated. Therefore, problems can be avoided such that the contacting ends of the upper pin 2a and lower pin 3a are separated to cause the weld nut N to come off and drop, or the weld nut N is displaced to inhibit itself from being inserted onto the front end portion of the lower pin 3a.

Additionally, a spring such as a coil spring may be used as a repulsive-force generating arrangement in place of the lower magnet 41 and the upper magnet 42. The spring is interposed between the surface at the top of the cavity 2c and the upper surface of the upper pin 2a. The spring pushes the upper pin 2a downward, because the repulsive force increases as the upper pin 2a moves upward to shrink the spring. This allows for holding a state where the end of the upper pin 2a is in contact with the end of the lower pin 3a.

Still additionally, a repulsive-force generating arrangement may be configured as follows. That is, a side hole may be arranged on the upper electrode 2 to communicate with the cavity 2c in FIG. 6, as is the case with the cavity 3c of the lower electrode 3, and air may be blown through the side hole into the cavity 2c by a compressor (not shown) to create a positive pressure within the cavity 2c. In this configuration, a larger repulsive force is generated by the positive pressure in the cavity 2c to push the upper pin 2a downward as the upper pin 2a is moved higher, allowing for holding a state where the front end of the upper pin 2a is in contact with the front end of the lower pin 3a.

Further, the magnet 40 fixed to the upper pins 2a is configured to have an annular shape and is inserted onto the upper pin 2a.

With this configuration, in the state where the front end portion of the upper pin 2a protrudes downward from the upper electrode 2, the weld nut N, which is inserted onto the protruding front end portion of the upper pin 2a, is attracted and held by the magnetic force of the magnet 40, and in this case, the magnet 40 provides following advantages as it is in an annular shape. As the magnet 40 in an annular shape is inserted onto the upper pin 2a, the weld nut N, which is inserted onto the front end portion of the upper pin 2a at a position below the magnet 40, is applied with the magnetic force by the magnet 40 in an annular shape over the entire surface, facing to the magnet 40, of the weld nut N. This allows for attracting the welding nut N more strongly to hold it to the upper electrode 2.

Furthermore, the magnet 40 contacts with a bottom surface in the cavity of the upper electrode 2 in a state where the front end portion of the upper pin 2a protrudes downward from the upper electrode 2, while the magnet 40 is separated from the bottom surface in the cavity in a state where the upper pin 2a is pushed upward so that the front end portion of the upper pin 2a does not protrude.

With this configuration, when the magnet 40 is in contact with the bottom surface in the cavity of the upper electrode 2, the weld nut N, which is inserted onto the upper pin 2a protruding from the upper electrode 2, can be attracted by the magnetic force of the magnet 40 to surely hold the weld nut N. On the other hand, when the magnet 40 moves apart from the bottom surface of the upper electrode 2 as the upper pin 2a moves upward, the magnet 40 is separated from the weld nut N to apply a less force for attracting the weld nut N and then fails to hold the weld nut N.

Incidentally, if a permanent magnet is used as the magnet 40 for holding the weld nut N as in the case of the electrode structure for resistance welding according to the present embodiment, following advantageous effects can be gained in a robot system process. For example, it is assumed in the robot system process that a power failure has occurred while the weld nut N is held to the upper pin 2a of the upper electrode 2. In this case, recovery needs to be started in the robot system process from the state at the power failure.

However, with a structure of holding the weld nut N by an air pressure of the compressor as in Japanese Patent Application Publication No. H10-43870, the weld nut N drops after a power failure to make a different state at a recovery time from the state when operation was stopped due to the power failure. In this case, a person needs to pick the weld nut N up and make it pneumatically held to the upper electrode to return to the state when the operation was stopped due to the power failure. This inhibits the recovery from being started readily from the state at the power failure.

In the present embodiment, the permanent magnet 40 holds the weld nut N to the upper electrode 2, and therefore the weld nut N will not drop even at a power failure. This allows for starting recovery readily from the state at the power failure.

Still additionally, the lower pin 3a may have any shape that allows the weld nut N coming off the upper pin 2a to be inserted onto the lower pins 3a, and then, caught by and fitted to the lower pins 3a at a position higher than the position where the workpiece W is set on the lower electrode 3.

Figure 9:
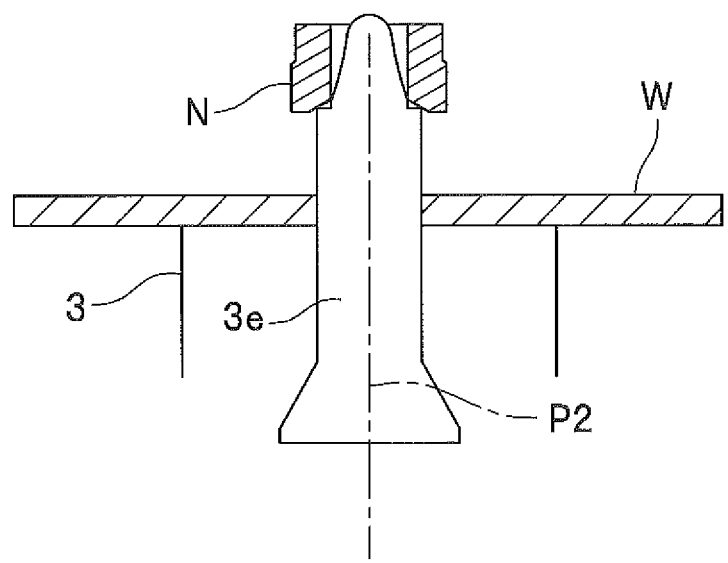
FIG. 9 is a diagram showing the lower guide pin having a front end portion in a stepped-cone shape.

For example, a lower guide pin 3e may be used that has an upper end portion (front end portion) in a conical shape having a step, as shown in FIG. 9. With the lower pin 3e, the weld nut N coming off the upper pin 2a is caught by and held to the step at a lower portion of the conical shape of the upper end portion. Even in this shape, the central axes of the through-holes of the weld nut N and the workpiece W are each aligned with the axis P2 of the lower pin 3e to allow the weld nut N to be suitably set at a predetermined welding position of the workpiece W.

Specific configurations other than those described above can be modified as appropriate without departing from the spirit of the present invention. The weld nut N may be a general one out of variety of nuts, or may be a ring-shaped metal member, other than the nut, made of a magnetic material. It should be noted that the annular magnet 40 may be an electromagnet.

The invention claimed is:

1. An electrode structure for resistance welding, for use in a resistance welding machine that energizes an upper and lower electrodes arranged so as to vertically face each other to weld a nut and a workpiece sandwiched between the upper and lower electrodes, the electrode structure comprising:

an upper pin that is provided in the upper electrode, has a first magnet fixed thereto and is built in a cavity formed inside the upper electrode so as to be vertically movable to allow a front end portion of the upper pin to protrude downward from the upper electrode, wherein a second magnet is fixed to a rear end portion of the upper pin located at the opposite side of the front end portion, and a third magnet is fixed on an upper side of the cavity so as to face the second magnet at a distance with the same polarity sides facing to each other; and a lower pin that is provided in the lower electrode, is arranged so as to face the upper pin and built in a cavity formed inside the lower electrode so as to be vertically moveable to allow a front end portion of the lower pin to protrude upward from the lower electrode, wherein, in a state where the front end portion of the upper pin protrudes downward from the upper electrode by a repulsive force between the second and third magnets, the nut inserted onto the front end portion of the protruding upper pin is attracted and held by a magnetic force of the first magnet; and in a state where the upper pin is pushed upward by the lower pin against the repulsive force so that the first magnet is separated from the nut by a predetermined distance, the nut comes off the upper pin and moves due to a less force for attracting the nut by the first magnet, and then fitted onto the lower pin at a position higher than the position where the workpiece inserted onto the lower pin is set on the lower electrode.

2. The electrode structure for resistance welding according to claim 1, wherein the upper pin includes a rod portion and a disc portion that is located at the rear end to have a T-shape in cross-section, and the first magnet has an annular shape and is inserted and fixed onto the rod portion, while the second magnet is mounted and fixed onto the disc portion.

3. The electrode structure for resistance welding according to claim 1, wherein the first magnet contacts on a bottom surface in the cavity of the upper electrode in a state where the front end portion of the upper pin protrudes downward from the upper electrode, while the first magnet is apart from the bottom surface in the cavity in a state where the upper pin is pushed upward so that the front end portion of the upper pin does not protrude downward from the upper electrode.

* * * * *